(12) United States Patent
Hitschmann et al.

(10) Patent No.: US 8,405,895 B2
(45) Date of Patent: Mar. 26, 2013

(54) OPTICAL SYSTEM WITH HIGH CONTRAST

(75) Inventors: Guido Hitschmann, Neuss (DE); Kay-Uwe Schenke, Neuss (DE)

(73) Assignee: 3M Innovative Properties Company, St. Paul, MN (US)

( * ) Notice: Subject to any disclaimer, the term of this patent is extended or adjusted under 35 U.S.C. 154(b) by 30 days.

(21) Appl. No.: 12/744,457

(22) PCT Filed: Nov. 10, 2008

(86) PCT No.: PCT/US2008/082949
§ 371 (c)(1),
(2), (4) Date: Aug. 26, 2010

(87) PCT Pub. No.: WO2009/070432
PCT Pub. Date: Jun. 4, 2009

(65) Prior Publication Data
US 2010/0328749 A1    Dec. 30, 2010

Related U.S. Application Data

(60) Provisional application No. 60/990,150, filed on Nov. 26, 2007.

(51) Int. Cl.
*G02B 26/00* (2006.01)
(52) U.S. Cl. ........ 359/238; 359/613; 359/614; 359/618; 359/290; 359/291
(58) Field of Classification Search .................... 359/238
See application file for complete search history.

(56) References Cited

U.S. PATENT DOCUMENTS

| | | | |
|---|---|---|---|
| 4,906,070 A | 3/1990 | Cobb, Jr. | |
| 5,056,892 A | 10/1991 | Cobb, Jr. | |
| 5,450,221 A | 9/1995 | Owen | |
| 5,563,738 A | 10/1996 | Vance | |
| 5,771,328 A | 6/1998 | Wortman | |
| 5,971,556 A | 10/1999 | Carter | |
| 6,354,709 B1 | 3/2002 | Campbell | |

(Continued)

FOREIGN PATENT DOCUMENTS

| JP | 09-054252 | 2/1997 |
|---|---|---|
| JP | 2005-055736 | 3/2005 |

(Continued)

OTHER PUBLICATIONS

International Search Report for PCT/US2008/082949, 3 pgs.

(Continued)

*Primary Examiner* — James Jones
(74) *Attorney, Agent, or Firm* — Robert S. Moshrefzadeh (57) ABSTRACT

An optical system is disclosed that includes a housing that has an interior, a reflective interior surface, and a first opening. The optical system further includes a spatial light modulator that is disposed proximate the first opening and a light source that is disposed within the interior of the housing. The spatial light modulator modulates the light that is emitted by the light source to form image rays. The optical system further includes a first light redirecting film that is disposed proximate the first opening between the spatial light modulator and the light source. The first light redirecting film recycles at least a portion of the light that is emitted by the light source. The optical system further includes an optically absorptive film that is disposed proximate the first opening between the spatial light modulator and the viewing position. The optically absorptive film receives the image rays from the spatial light modulator and displays the received image rays to the viewing position.

13 Claims, 5 Drawing Sheets

U.S. PATENT DOCUMENTS

| | | |
|---|---|---|
| 7,006,173 B1 | 2/2006 | Hiyama |
| 7,271,955 B2 | 9/2007 | Osawa |
| 7,551,239 B2 | 6/2009 | Fukushima |
| 2002/0133144 A1* | 9/2002 | Chan et al. ............... 606/4 |
| 2008/0007677 A1 | 1/2008 | Enomoto |

FOREIGN PATENT DOCUMENTS

| | | |
|---|---|---|
| KR | 10-2005-0035196 | 4/2005 |
| KR | 10-2006-0041728 | 5/2006 |
| KR | 10-2007-0032688 | 3/2007 |
| WO | WO 02/082178 | 10/2002 |
| WO | WO 03/042725 | 5/2003 |
| WO | WO 2004/091956 | 10/2004 |
| WO | WO 2009/070389 | 6/2009 |

OTHER PUBLICATIONS

Written Opinion of the ISA for International Application No. PCT/US2008/082949, 3 pgs.
International Search Report for PCT/US2008/079800, 3 pgs.
Written Opinion of the ISA for International Application No. PCT/US2008/079800, 4 pgs.

* cited by examiner

OPTICAL SYSTEM WITH HIGH CONTRAST

CROSS REFERENCE TO RELATED APPLICATIONS

This application is a national stage filing under 35 U.S.C. 371 of PCT/US2008/082949, filed on Nov. 10, 2008, which claims priority to U.S. Provisional Application No.60/990, 150, filed on Nov. 26, 2007, the disclosure of which is incorporated by reference in its entirety herein.

REFERENCE TO RELATED APPLICATIONS

This application is related to commonly-assigned patent application OPTICAL SYSTEM WITH HIGH CONTRAST, having Application No. 60/990,157, and filed on the same date herewith.

FIELD OF THE INVENTION

This invention generally relates to display devices. The invention is particularly applicable to display devices where it is desirable to display an image with high contrast.

BACKGROUND

Display devices generally display information to a viewer. The performance of a display is described in terms of various characteristics of the display. One such characteristic is the ability of the display to absorb ambient light originated from various sources of light such as a light bulb in a room or on a street or the sun. Generally, ambient light that is incident on a display and not absorbed by the display is superimposed on the displayed information resulting in reduced contrast. The reduced contrast due to ambient light is generally referred to as washout. Washout is especially a concern in applications where the ambient light is very bright. For example, in outdoor applications, ambient light from the sun can significantly reduce the display contrast making it difficult for a viewer to discern the displayed information. A display, such as an instrument panel used in a motor vehicle, is particularly susceptible to washout from sun light. Typically, instrument panels in a motor vehicle are recessed in a housing to reduce ambient light access to the display. The housing is generally made black to further reduce washout by reducing the amount of light that is reflected by the housing.

Another characteristic of a display is the viewing angle. It is generally desirable that the displayed information be easily viewable over a predetermined range of viewing angles. In some cases, it is further desirable that the displayed information not be viewable outside a predetermined viewing range. In other words, it may be desirable to limit the viewability of a display to a particular and intended viewing position. For example, limiting the display viewability may be desirable for privacy considerations. Another setting where such limitation may be desirable is where viewability of the display by a person located outside the intended viewing position may interfere with the person's ability to perform a given task. For example, in a motor vehicle, it may be desirable that a display or an instrument cluster be viewable by the driver but not by the other passengers as it may interfere with their comfort. Reflection of light that originates from an instrument display off of a windshield, a side window, or other glossy surfaces in a motor vehicle can be distracting to a driver. Typically, the recessed housing of an instrument cluster in a motor vehicle is designed to limit the viewing angle of the displayed information.

Another characteristic of a display is the overall footprint. Displays are generally desirable to have minimized depth in order to reduce the depth and/or the overall volume of the display. For example, in the case of an instrument panel in a motor vehicle, it may be desirable to minimize the recess in the instrument housing in order to save space or, for example, make room for accessories. As one display characteristic is improved, one or more other display characteristics often degrade. As a result, certain tradeoffs are made in a display device in order to best meet the performance criteria for a given display application. Thus, there remains a need for displays with improved overall performance while meeting the minimum performance criteria.

SUMMARY OF THE INVENTION

Generally, the present invention relates to optical systems. The present invention also relates to optical systems that can display an image with high contrast.

In one embodiment of the invention, an optical system for displaying an image to a viewing position includes a housing that has an interior, a reflective interior surface, and a first opening. The optical system further includes a spatial light modulator that is disposed proximate the first opening and a light source that is disposed within the interior of the housing. The spatial light modulator modulates the light that is emitted by the light source to form image rays. The optical system further includes a first light redirecting film that is disposed proximate the first opening between the spatial light modulator and the light source. The first light redirecting film recycles at least a portion of the light that is emitted by the light source. The optical system further includes an optically absorptive film that is disposed proximate the first opening between the spatial light modulator and the viewing position. The optically absorptive film receives the image rays from the spatial light modulator and displays the received image rays to the viewing position.

BRIEF DESCRIPTION OF DRAWINGS

The invention may be more completely understood and appreciated in consideration of the following detailed description of various embodiments of the invention in connection with the accompanying drawings, in which.

In the specification, a same reference numeral used in multiple figures refers to the same or similar elements having the same or similar properties and functionalities.

DETAILED DESCRIPTION

The present invention is generally related to electronic display devices. The disclosures are particularly related to display devices used in an environment where it is desirable for the display to have a small foot print and absorb a substantial portion of the ambient light. The disclosures are particularly suited for display devices used outdoors or in environments with very bright ambient light.

Figure 1:
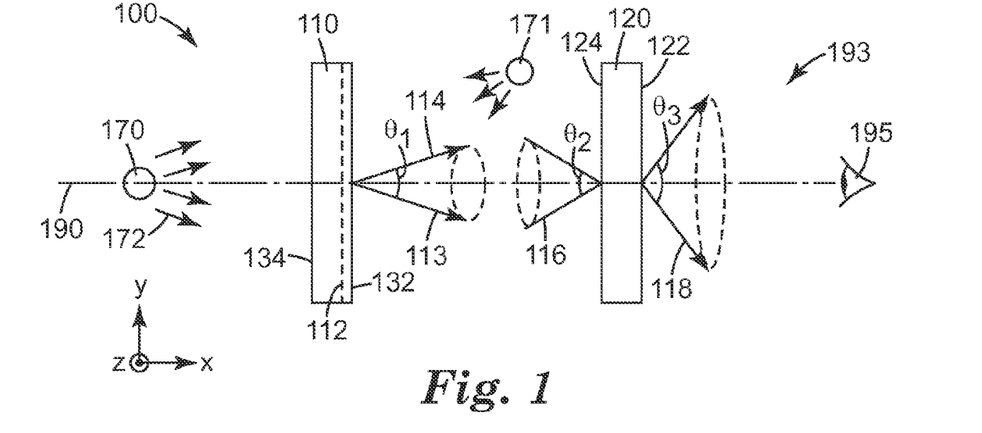
FIG. 1 is a schematic side-view of an optical system.

FIG. 1 shows a schematic side-view of an optical system 100 for displaying an image to a viewing position 193 that may include a viewer 195. Optical system 100 is centered on an optical axis 190 and includes an image forming device 110 that is capable of forming an image in a display plane 112 that is located within device 110. The display plane emits image rays 113 within an emitted cone 114 defined as the smallest axially symmetric cone that includes all the emitted image rays that have an intensity that is at least half the maximum intensity $I_{max}$ of the emitted image rays. Emitted cone 114 has an associated emitted cone $\theta_1$.

Figure 2:
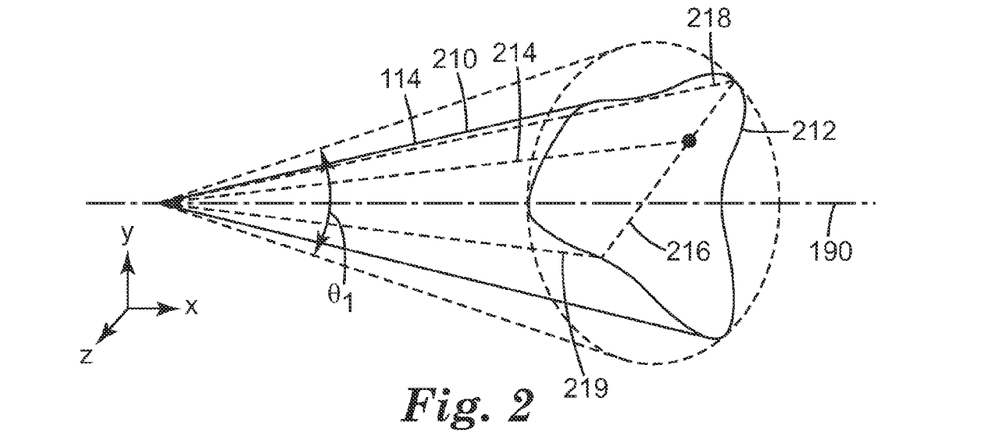
FIG. 2 is a schematic three-dimensional view of a cone of light rays.
Figure 3:
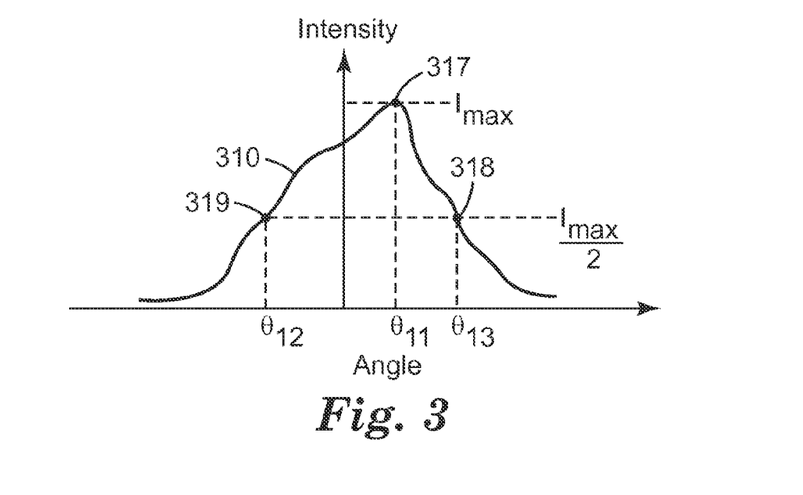
FIG. 3 is a schematic plot of intensity versus angle.

For example, FIG. 2 shows a schematic of a cone of image rays 210 that includes an image ray 214 having a maximum intensity $I_{max}$. All the other image rays within cone 210 have intensities not less than $I_{max}/2$. For example, FIG. 3 shows a schematic plot of intensity versus angle for the image rays that lie in a cross-section 216 of cone 210 where cross-section 216 includes image ray 214 having maximum intensity $I_{max}$ and limiting rays 218 and 219. In FIG. 3, point 317 at angle $\theta_{11}$ corresponds to image ray 214, point 318 at angle $\theta_{13}$ corresponds to limiting image ray 218, and point 319 at angle $\theta_{12}$ corresponds to limiting image ray 219. All the image rays between angles $\theta_{12}$ and $\theta_{13}$ have light intensities that are not less than $I_{max}/2$. In some cases, cone 210 can have a symmetry, such as an axial symmetry or a plane symmetry. In some cases, cone 210 is asymmetric, meaning that is does not have any symmetries.

In FIG. 2, cone 114 is the smallest axially symmetric cone that includes cone of image rays 210. Cone 114 has axial symmetry about an axis, such as optical axis 190. Referring back to FIG. 1, each image ray in the axially symmetric emitted cone 114 has an optical intensity that is at least $I_{max}/2$.

Optical system 100 further includes an optical film 120 that has an input side 124 facing image forming device 110 and display plane 112, and a viewing side 122 opposite input side 124. Optical film 120 has a maximum optical transmittance of $T_{max}$ and an acceptance cone 116 defined as the largest axially symmetric cone where each incident ray within the cone has an optical transmittance not less than half of $T_{max}$. Acceptance cone 116 has an associated acceptance angle $\theta_2$.

Figure 4:
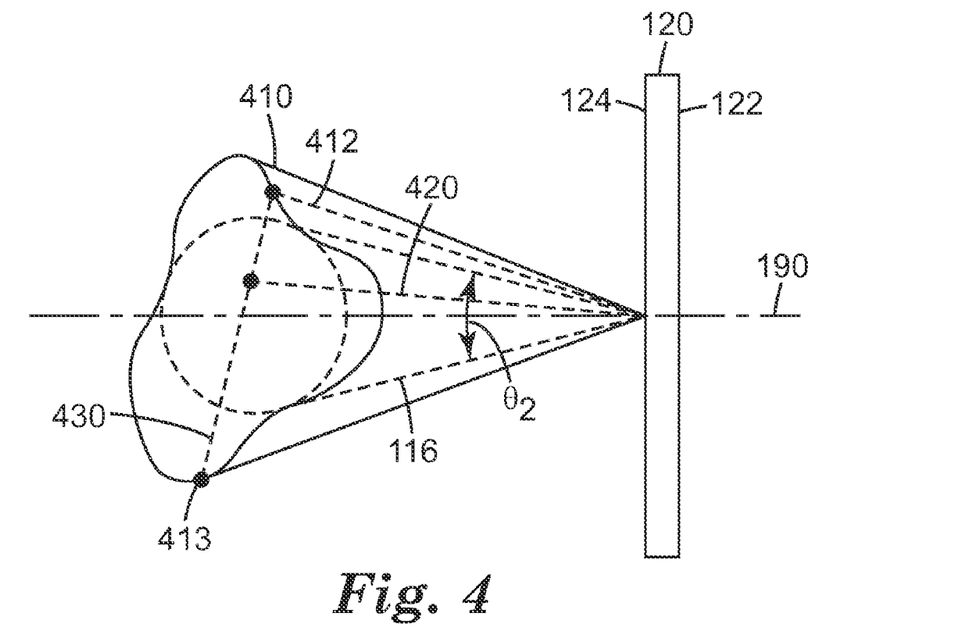
FIG. 4 is a schematic three-dimensional view of a cone of light rays.
Figure 5:
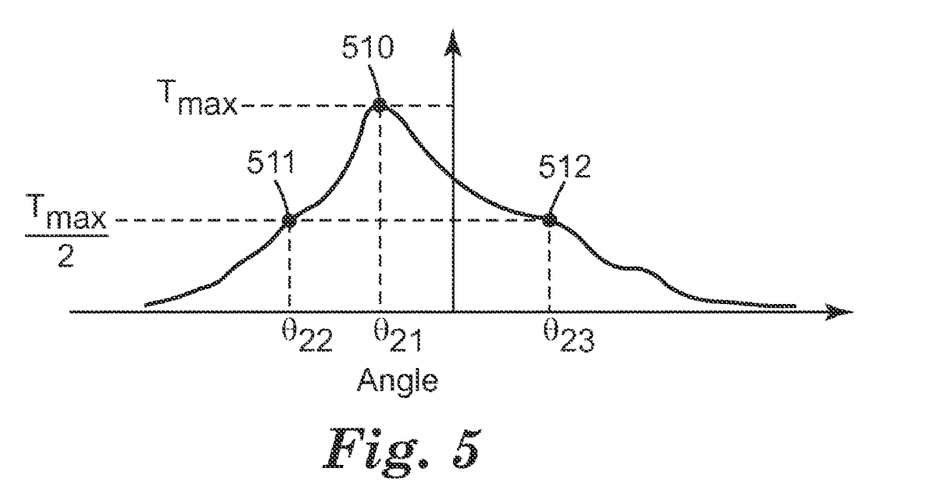
FIG. 5 is a schematic plot of transmittance versus angle.

For example, FIG. 4 shows a schematic of an incident cone 410 of light rays incident on optical film 120 that includes a ray 420 having maximum transmittance $T_{max}$. Cone 116 is the largest axially symmetric cone where each ray in the cone has an optical transmittance that is not less than $T_{max}/2$. For example, FIG. 5 shows a schematic plot of transmittance versus angle for the incident rays that lie in a cross-section 430 of cone 116 where cross-section 430 includes incident ray 420 having maximum transmittance $T_{max}$ and limiting incident rays 412 and 413. In FIG. 5, point 510 at angle $\theta_{21}$ corresponds to incident ray 420, point 511 at angle $\theta_{22}$ corresponds to limiting incident ray 412, and point 512 at angle $\theta_{23}$ corresponds to limiting incident ray 413. All the incident rays between angles $\theta_{22}$ and $\theta_{23}$ have transmittance values that are not less than $T_{max}/2$. In some cases, incident cone 410 of all the image rays can have a symmetry such as an axial symmetry or a plane symmetry. In some cases, incident cone 410 is asymmetric, meaning that is does not have any symmetries.

In FIG. 4, cone 116 is the largest axially symmetric cone that can be included in cone 410. Cone 116 has axial symmetry about an axis, such as optical axis 190. Referring back to FIG. 1, each incident image ray in the axially symmetric cone 116 is transmitted by optical film 120 with an optical transmittance that is at least $T_{max}/2$.

In optical system 100 shown in FIG. 1, optical film 120 receives emitted image rays 113 from input side 124 of the optical film. Optical film 120 substantially transmits the received image rays that are inside incident cone 116 and substantially blocks image rays outside incident cone 116. As used herein, optical film 120 having a maximum optical transmittance $T_{max}$ is said to substantially transmit an image ray if the optical transmittance of the image ray is at least $T_{max}/2$. Furthermore, optical film 120 substantially blocks an image ray if the optical transmittance of the image ray is less than $T_{max}/2$.

In general, emitted and acceptance angles $\theta_1$ and $\theta_2$, respectively, can have any value that is desirable in an application. In some cases, acceptance angle $\theta_2$ is at least as large as emitted angle $\theta_1$. In such cases, there may be no need to include an optical element that has an optical power, such as collimating lenses and/or mirrors, between optical film 120 and image forming device 110. In some cases, there may be one or more optical elements with no optical power such as a plane mirror, a polarizer, a color or intensity filter, or a retarder between optical film 120 and image forming device 110.

In some cases, display plane 112 and optical film 120 are separated along optical axis 190 by a distance less than about 10 cm, or by a distance less than about 5 cm, or by a distance less than about 2 cm, or by a distance less than about 5 cm, or by a distance less than about 0.5 cm.

The exemplary optical system 100 shown in FIG. 1 is centered on optical axis 190. In general, the optical system may or may not be centered on an optical axis. For example, in some cases, optical film 120 may be shifted up or down so that it no longer is centered on the optical axis. In some cases, at least one of the emitted and acceptance cones is not centered on optical axis 190 even where all the optical elements in optical system 100 are centered on the optical axis. In some cases, at least one of the emitted and acceptance cones is centered on optical axis 190.

Optical axis 190 is not folded in the exemplary optical system shown in FIG. 1. In general, the optical axis may or may not be folded. For example, in some cases, the optical axis may be folded to reduce the overall footprint by, for example, using one or more folding mirrors.

Optical film 120 receives the image rays emitted by display plane 112 from input side or face 124 and transmits the received image rays through a viewing side or face 122 that is positioned opposite input side 124. Viewing side 122 displays the image received by optical film 120 to viewing area 193. Light is transmitted by optical film 120 within a viewing cone 118 which is the largest axially symmetric cone that includes all the transmitted image rays that have an intensity that is at least half the maximum intensity $I_{max}$ of all the transmitted image rays. Viewing cone 118 has an associated viewing angle $\theta_3$.

In some cases, image forming device 110 can be a reflective display, a transmissive display, or an emissive display, or a combination of different display types, such as a transflective display. A reflective display 110 requires front lighting, meaning illumination of the reflective display from a front side 132 of the display. In some cases, a front light source may be an ambient light 130 which can be, for example, sunlight or room light. In some cases, front lighting can be provided by a light source 171 that is a part of, for example, optical system 100 and illuminates reflective display 110 from front side 132 of the display. In some cases, a reflective display can include an LCD or a digital micro-mirror array display, such as a Digital Light Processor (DLP) display from Texas Instruments, Inc.

A transmissive display 110 requires back lighting, meaning illumination of the transmissive display from a back side 134 of the display. In some cases, transmissive display 110 can include a backlight as a component of the display. For example, transmissive display 110 can be a liquid crystal display that includes a backlight that includes, for example, a lightguide, a light source, a reflective film, a diffuser, and one or more light redirecting films. In some cases, optical system 100 can include a light source 170 that emits light 172 that has no information or image content and that illuminates transmissive display 110 from back side 134 of the display.

In some cases, image forming device 110 can be an emissive display, meaning that the display includes a plurality of light emitting elements, such as emissive pixels, that can also form an image. In general, an emissive display does not require front or back lighting.

Figure 6:
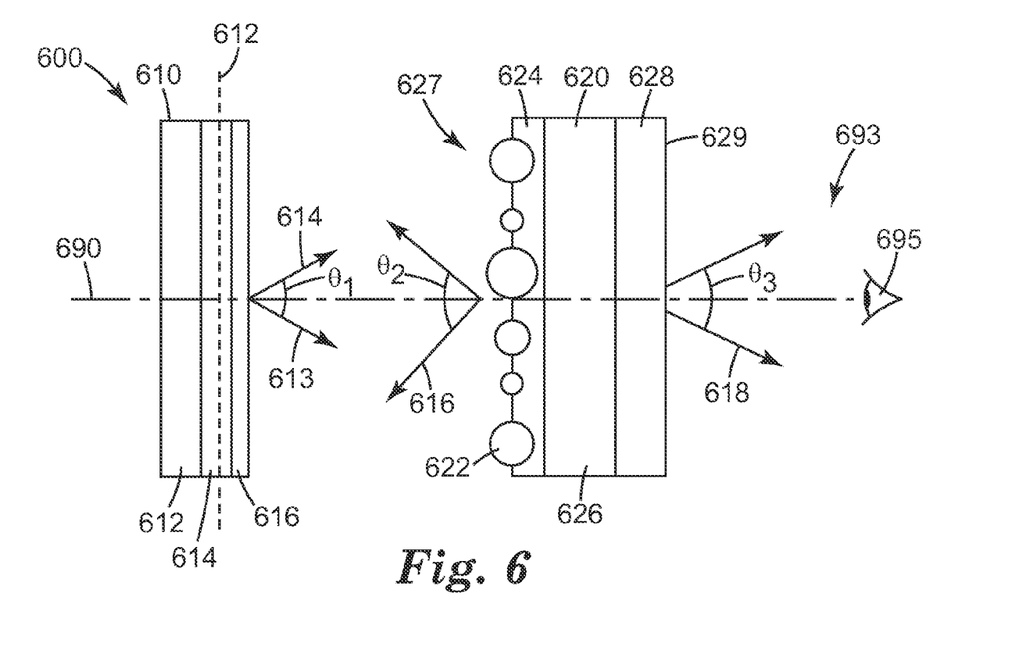
FIG. 6 is a schematic side-view of an optical system.

FIG. 6 shows a schematic side-view of an optical system 600 that is centered on an optical axis 690 and includes a liquid crystal display (LCD) 610 and an optical film 620 for displaying an image to a viewing position 693 that may include a viewer 695. LCD 610 includes a liquid crystal panel 614, a backlight 612 for providing light to panel 614, and a front cover 616. LCD 600 is an image forming device capable of forming an image in a display plane 612 which can be positioned, for example, within liquid crystal panel 614.

Display plane 612 emits image rays 613 within an emitted cone 614 defined as the smallest axially symmetric cone that includes all the emitted image rays that have an intensity that is at least half the maximum intensity $I_{max}$ of all of the emitted image rays. Emitted cone 614 has an associated emitted angle $\theta_1$ which is the full angle subtended by cone 614.

Optical film 620 includes an input side 627 facing image forming device 610 and display plane 612, and a viewing side 629 opposite input side 627 and facing viewing position 693. Optical film 620 has a maximum optical transmittance of $T_{max}$ and an acceptance cone 616 defined as the largest axially symmetric cone where each incident ray within the cone has an optical transmittance not less than half of $T_{max}$. Acceptance cone 616 has an associated acceptance angle $\theta_2$ which is the full angle subtended by cone 616. In some cases, acceptance angle $\theta_2$ is equal to or greater than emitted angle $\theta_1$. In such cases, optical film 620 may be positioned adjacent LCD 612 with no or very little loss in collecting the image rays emitted by the LCD.

Optical film 620 substantially transmits the received image rays that are inside acceptance cone 616 and substantially blocks image rays outside acceptance cone 616, where a ray is substantially transmitted if the optical transmittance for the ray is at least one half of the maximum transmittance of the optical film, and a ray is substantially blocked if the optical transmittance for the ray is less than one half of the maximum transmittance of the optical film.

Optical film 620 further includes an optically absorptive layer 624 disposed on a first substrate 626, a second substrate 628, and a plurality of optically transparent beads 622 partially embedded in optically absorptive layer 624. The embedded portions of beads 622 are on the viewing side of optical film 620 and the non-embedded portions of beads 622 are on the input side of optical film 620. In some cases, an index of refraction of beads 622, for example in the visible range of the electromagnetic spectrum, is in a range from about 1.3 to about 2.6, or from about 1.5 to about 2.6, or from about 1.5 to about 2.4, or from about 1.5 to about 2.1, or from about 1.5 to about 1.9.

In some cases, the optical absorption coefficient of optically absorptive layer 624, for example in the visible, is at least 0.1 inverse microns, or at least 0.2 inverse microns, or at least 0.4 inverse microns, or at least 0.6 inverse microns.

Image rays incident on optical film 620 are transmitted by the film primarily through beads 622, where the beads effectively function as focusing lenses. In some cases, absorptive layer 624 is optically opaque, meaning that the transmittance of the absorptive layer is less than about 1%. In some cases, absorptive layer 624 can be partially transmissive. In such cases, the transmittance of the absorptive layer is less than about 20%, or less than about 10%, or less than about 5%.

Acceptance angle $\theta_2$ is a function, in part, of bead index, absorption coefficient of the beads, and the size of the gaps between the beads and optically transparent substrate 626 as described in, for example, U.S. Pat. No. 5,563,738.

Image rays received by optical film 620 are transmitted toward viewing position 693 within a viewing cone 618 with an associated viewing angle $\theta_3$, where viewing cone 618 is the largest axially symmetric cone that includes all the transmitted image rays that have an intensity that is at least half the maximum intensity $I_{max}$ of the transmitted image rays. In some cases, viewing angle $\theta_3$ is different than acceptance angle $\theta_2$. In some cases, viewing angle $\theta_3$ is greater than acceptance angle $\theta_2$. In some cases, viewing angle $\theta_3$ is not greater than acceptance angle $\theta_2$.

In general, at least a portion of emitted image rays 613 received by the optical film is transmitted through beads 622. In some cases, most of the light transmitted by optical film 620 is transmitted through beads 622. In some cases, optical film 620 substantially blocks the received image rays outside acceptance cone 616 primarily by absorbing the image rays.

In some cases, acceptance angle $\theta_2$ is less than about 70 degrees, or less than about 60 degrees, or less than about 50 degrees, or less than about 40 degrees, or less than about 30 degrees.

In some cases, optical system 600 can have a small footprint when, for example, acceptance angle $\theta_2$ is greater than or substantially greater than emitted angle $\theta_1$. In some cases, $\theta_2$-$\theta_1$ is at least 5 degrees, or at least 10 degrees, or at least 15 degrees, or at least 20 degrees, or at least 25 degrees, or at least 30 degrees, or at least 35 degrees, or at least 40 degrees. In some cases, LCD 610 is designed so that image rays 613 emitted by the LCD are within an emitted cone 614 with an emitted angle $\theta_1$ where $\theta_1$ is no more than 40 degrees, or no more than 30 degrees, or no more than 25 degrees, or no more than 20 degrees, or no more than 15 degrees, or no more than 10 degrees.

In some cases, substrates 626 and/or 628 can have high optical transmission. The substrates can be optically clear or diffuse. A diffusive substrate 626 can be a bulk diffuser and/or a surface diffuser. Bulk diffusion can be achieved by, for example, incorporating particles in the substrate. Surface diffusion can be achieved by, for example, making the surface of the substrate matte. Substrates 626 and/or 628 can be flexible or rigid and may have a colorant to modify, for example optimize, the color of the light exiting optical film 620 toward viewing position 693. Substrates 626 and/or 628 can be any material that is suitable in an application, such as polyethylene terapthalate (PET), polycarbonates, acrylics, and glass.

In some cases, substrates 626 and 628 primarily provide support for the other components, such as absorptive layer 624, in optical film 620. In some cases, at least one of substrates 626 and 628 provides one or more additional optical functions. For example, substrate 628 can be an optical diffuser, an absorbing polarizer, a reflective polarizer, or any other film with a function that may be desirable in an application. For example, in some cases, substrate 628 can be a polymeric multilayer optical film (MOF) reflective polarizer that substantially reflects light of one polarization and substantially transmits light of a second polarization orthogonal to the first polarization. In such cases, image forming device 610 can be a device, such as an LCD, that emits a polarized image that is parallel to a pass axis of MOF 628. In some cases, the first and second polarizations can be orthogonal linear polarizations. An example of a linear reflective polarizer is Dual Brightness Enhancing Film (DBEF) available from Minnesota Mining and Manufacturing Company of Saint Paul, Minn. In some cases, the first and second polarizations can be orthogonal circular polarizations, in which case, substrate 628 may also include a ¼ wave retarder. An example of a reflective circular polarizer is a cholesteric film, such as Nipocs film available from Nitto-Denko of Japan. Other exemplary reflective polarizers include DRPF reflective polarizers also available from 3M Company. In some cases, a reflective polarizer 628 can reflect light of one polarization substantially over the entire visible range.

In some cases, such as when substrate 628 is a reflective polarizer, in the absence of image rays 613, viewing side 629 has a metallic appearance, such as a metallic silver appearance.

In the exemplary optical system 600, substrate 628 is attached to substrate 626. In some cases, substrate 628 may be a separate film, separated from substrate 626 by, for example, an air gap.

Beads 622 can be made of any material that is suitable in an application such as a material that is clear and highly optically transmissive to visible light. Examples of suitable materials for beads 622 include various types of glass, polymeric materials including polymethylmethacrylate (PMMA), polystyrene, and mixtures of two or more different materials.

In some cases, beads 622 are substantially spherical. In general, beads 622 can have any shape that may be suitable in an application, such as oval or other desired shapes. For example, beads 622 can include uniformly oriented oval beads to asymmetrically spread light along the horizontal and vertical directions. In some cases, the diameter range of beads 622 and the thickness of optically absorptive layer 624 are chosen so that most beads are only partially embedded in layer 624 to increase optical transmittance of optical film 620 while maintaining high image contrast displayed by optical system 600.

In some cases, optical transmittance of optical film 620 for normal incidence from input side 627 is in a range from about 30% to about 40%, and for normal incidence from viewing side 629 is in a range from about 5% to about 15%. In some cases, specular optical reflectance of optical film 620 for normal incidence from input side 627 is less than about 1% or less than about 0.5%, and for normal incidence from viewing side 629 is less than about 5%. In some cases, an anti-reflection coating on the viewing side can reduce the reflection from this side to less than about 1% or less than about 0.5%.

In some cases, optically absorptive layer 624 can include a light absorptive material dispersed in an optically clear binder. In some cases, light absorptive materials can include carbon black, light absorptive dyes such as black dyes. In some cases, an optically clear binder include thermoplastics, radiation cured or thermoset acrylates, epoxies, silicone-based materials, or pressure sensitive adhesives.

Figure 7:
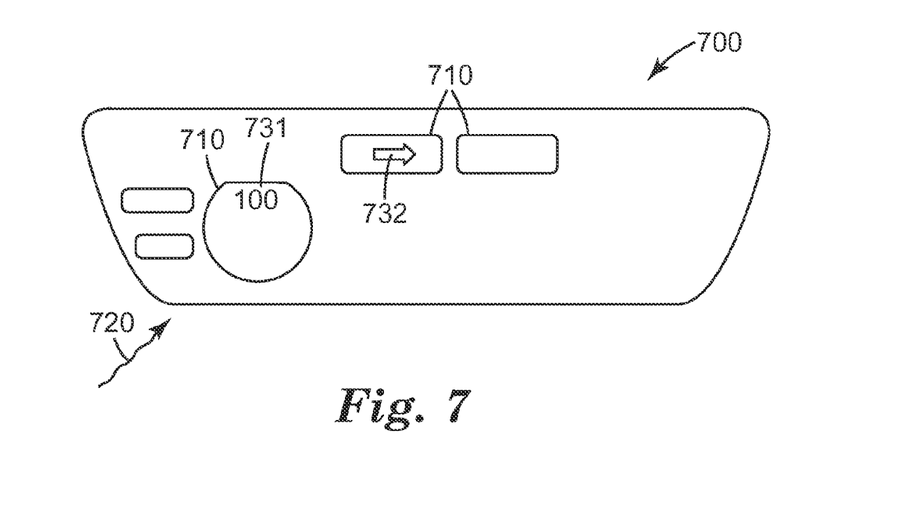
FIG. 7 is a schematic front-view of an instrument panel.

FIG. 7 shows a schematic front-view of an instrument panel 700 in, for example, a motor vehicle or an air plane. Instrument panel 700 includes one or more instrument clusters 710 for displaying information to a viewer, such as a driver, a pilot, or a passenger. An instrument cluster can include an optical system similar to any optical system disclosed herein, such as optical system 100 or optical system 600. An advantage of using optical system 600 in an instrument cluster is that a substantial portion of ambient light 720 incident on the instrument cluster is absorbed by the optically absorptive layer 624, thereby reducing or eliminating washout and increasing contrast of any information or image that is being displayed by the instrument cluster.

In some cases, an instrument cluster can include an image forming device that includes display graphics, such as alphanumerics 731 and right arrow indicator 732. In some cases, an instrument cluster in a motor vehicle can include an optical system 600 where image forming device 610 is capable of displaying a high contrast movie to, for example, the passengers in the motor vehicle.

Another advantage of using optical system 600 in an instrument panel is reduced footprint when, for example, emitted angle $\theta_1$ is substantially less than acceptance angle $\theta_2$. In such cases, optical film 620 can be positioned adjacent or nearly adjacent to image forming device 610, where the separation between the two can be less than 2 cm, or less than 1 cm, or less than 0.5 cm, or less than 0.2 cm.

Figure 8:
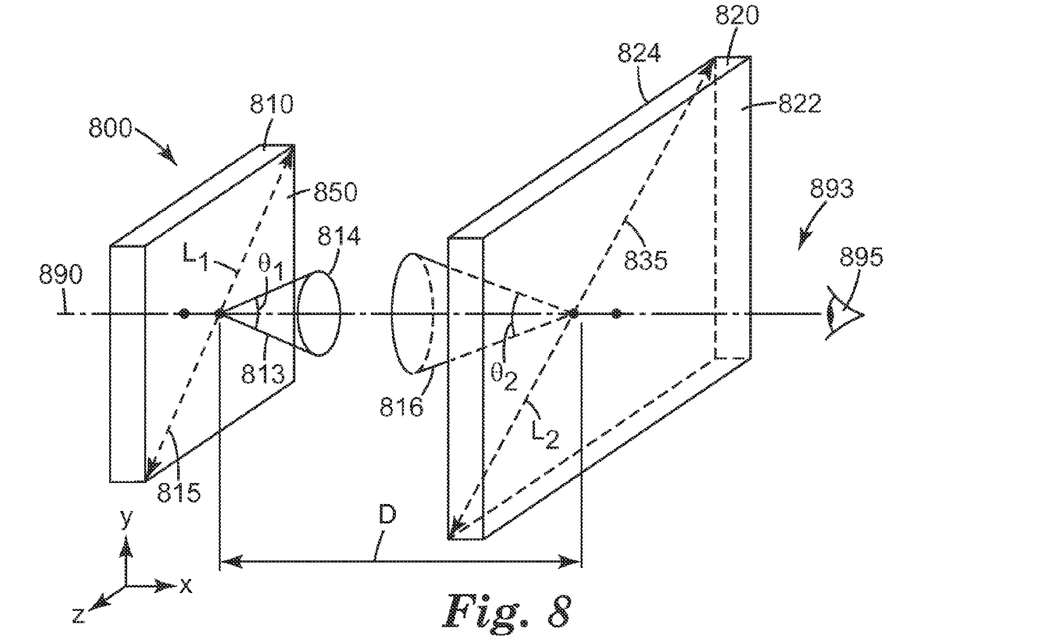
FIG. 8 is a schematic three-dimensional view of an optical system.

FIG. 8 shows a schematic three-dimensional view of an optical system 800 for displaying an image or information to a viewing area 893 that can include a viewer 895. Optical system 800 is centered on an optical axis 890 and includes an image forming device 810 similar to image forming device 110 and an optical film 820 similar to optical film 120. Image forming device 810 includes an exit face 850 and emits image rays 813 within an emitted cone 814. Exit face 850 has a longest dimension "$L_1$" along the exit face. In the exemplary optical system shown in FIG. 8, the exit face is rectangular and the longest dimension is length $L_1$ of diagonal 815 of the exit face. In general, exit face can have any shape that may be desirable in an application and the longest dimension of the exit face can be along any direction. Emitted cone 814 has an associated emitted angle $\theta_1$.

Optical film 820 includes an input face 824 that faces exit face 850 of image forming device 810 and a viewing face 822 opposite input face 824 that faces viewing area 893. Optical film 820 receives emitted image rays 813 through input face 824 of the optical film and transmits the received image rays through viewing face 822 of the optical film toward viewing position 893. Input face 824 has a longest dimension "$L_2$" along the input face. In the exemplary optical system shown in FIG. 8, the input face is rectangular and the longest dimension is length $L_2$ of diagonal 835 of the input face. In general, input face can have any shape that may be desirable in an application and the longest dimension of the input face can be along any direction. Optical film 820 has an acceptance cone 816 that has an acceptance angle $\theta_2$ where, in some cases, $\theta_2$ can be equal to or greater than $\theta_1$.

The distance between exit face 850 of image forming device 810 and input face 824 of optical film 820 is "D". In some cases, distance "D" is substantially smaller than $L_1$ and $L_2$. In some cases, distance D is at least 2 times less than the smaller of $L_1$ and $L_2$, or at least 4 times less than the smaller of $L_1$ and $L_2$, or at least 8 times less than the smaller of $L_1$ and $L_2$, or at least 10 times less than the smaller of $L_1$ and $L_2$, or at least 20 times less than the smaller of $L_1$ and $L_2$, or at least 30 times less than the smaller of $L_1$ and $L_2$, or at least 40 times less than the smaller of $L_1$ and $L_2$, or at least 50 times less than the smaller of $L_1$ and $L_2$, or at least 100 times less than the smaller of $L_1$ and $L_2$, or at least 500 times less than the smaller of $L_1$ and $L_2$.

In some cases, optical system 800 does not include any optical elements with optical power between image forming device 810 and optical film 820.

In some cases, image forming device 810 can include permanent or replaceable graphics, such as pictures, maps, or icons. In some cases, image forming device 810 can include an electronic display such as a liquid crystal display (LCD), a cathode ray tube (CRT), a plasma display, an electroluminescent display, an OLED, or an electrophoretic display.

Figure 9:
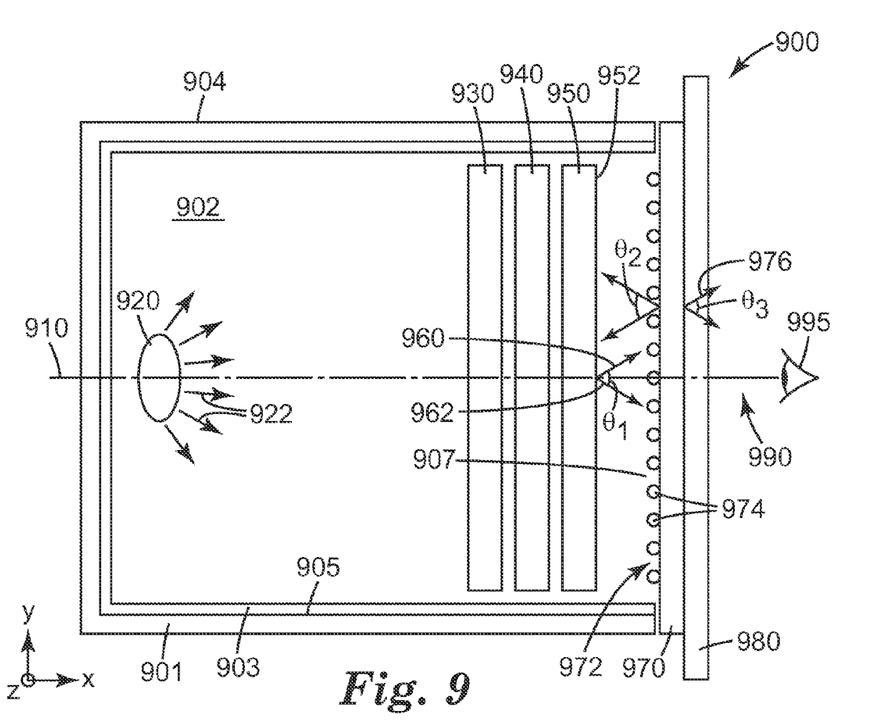
FIG. 9 is a schematic side-view of an optical system.

FIG. 9 shows a schematic side-view of an optical system 900 for displaying an image to a viewing position 990 that can include a viewer 995. Optical system 900 includes a housing 901 that includes an interior 902, a reflective interior surface 905, and a first opening 907. Optical system 900 further includes a spatial light modulator (SLM) 950 that is positioned proximate or near first opening 907 and a light source 920 that is disposed within the interior of housing 901 and emits light 922. Reflective interior surface 905 of housing 902, in part, recycles and homogenizes light that is emitted by light source 920. In some cases, light 922 does not contain any images, data or information. SLM 950 modulates light 922 to form transmitted image rays 962. Modulated image rays 962 carry information, data, or an image. In some cases, image rays 962 are substantially polarized. For example, the image rays can be substantially linearly or circularly polarized. In some cases, image rays 962 are substantially un-polarized.

Optical system 900 also includes a first light redirecting film 930 that is disposed proximate first opening 907 between SLM 950 and light source 920, and a second light redirecting film 940 disposed proximate first opening 907 between first light redirecting film 930 and SLM 950. Light directing films 930 and 940 recycle at least a portion of light 922 that is emitted by light source 920. In some cases, one or both light redirecting films can be a prismatic film, such as prismatic films described in, for example, U.S. Pat. Nos. 4,906,070 and 5,056,892.

Figure 10:
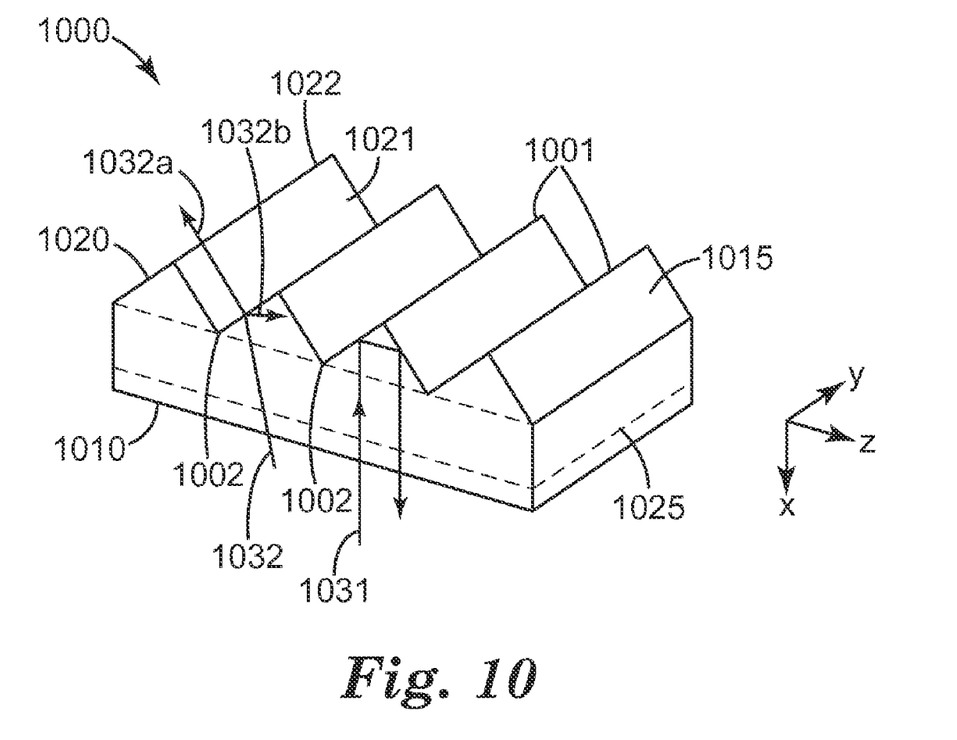
FIG. 10 is a schematic three-dimensional view of a prismatic light redirecting film.

FIG. 10 shows a schematic three-dimensional view of a prismatic light redirecting film 1000 that can be used as light directing film 930 and/or light directing film 940 in FIG. 9. Film 1000 has a major first surface 1010 and a microstructured second major surface 1020. Film 1000 further includes a plurality of linear prisms 1015 each of which has two side surfaces, such as side surfaces 1021 and 1022, and extends linearly along the y-axis. Film 1000 has a prismatic cross-section in the xz-plane. Film 1000 further has a plurality of peaks 1001 and grooves 1002. In some cases, peaks 1001 have a same height as measured from a common reference plane 1025 placed any where between first and second major surfaces 1010 and 1020, respectively. In some other cases, peaks 1001 can have different heights as described in, for example, U.S. Pat. No. 5,771,328 and/or the height of a peak for a prism can vary along the extended direction of the prism as described in, for example, U.S. Pat. No. 6,354,709.

The operation of light directing film 1000 is described in, for example, U.S. Pat. No. 5,056,892. In summary, a light ray, such as ray 1031, that strikes structured surfaces 1021 or 1022 at incident angles larger than the critical angle are totally internally reflected back. On the other hand, a light ray, such as ray 1032, that is incident on surfaces 1021 or 1022 at angles less than the critical angle is partly transmitted (such as ray 1032a) and partly reflected (such as ray 1032b). An end result is that, when employed in a display, such as a liquid crystal display or optical system 900, light directing film 1000 can improve on-axis (along the x-axis) transmission by recycling light that is totally internally reflected.

Referring back to FIG. 9, in some cases, the linear prisms in light redirecting films 930 and 940 can extend along different directions. For example, the linear prisms in light redirecting film 930 can extend along the y-axis and the linear prisms in light redirecting film 940 can extend along the z-axis.

Spatial light modulator 950 can be any type SLM that can be suitable in an application. For example, SLM 950 can be a liquid crystal display, a grating-type light valve, or a digital micro-mirror device. In some cases, image rays 962 are modulated and transmitted by SLM 950 within an emitted cone 960 that has an associated emitted angle $\theta_1$.

Optical system 900 further includes an optically absorptive film 970 that is disposed proximate first opening 907 between SLM 950 and viewing position 990. Optically absorptive film 970 receives image rays 960 that are modulated and emitted by SLM 950 and transmits and displays the received image rays to viewing position 990.

In some cases, optically absorptive film 970 has an input acceptance cone 960 that has an input acceptance angle $\theta_2$. In some cases, $\theta_2$ is equal to $\theta_1$. In some cases, $\theta_2$ is greater than $\theta_1$. In some cases, $\theta_2$ is greater than $\theta_1$ by at least 5 degrees, or by at least 10 degrees, or by at least 15 degrees, or by at least 20 degrees, or by at least 30 degrees, or by at least 40 degrees.

In some cases, the spacing between optically absorptive film 970 and SLM 950 can be less than 2 cm, or less than 1 cm, or less than 0.5 cm, or less than 0.2 cm. In some cases, an input face 972 of optically absorptive film 970 is in physical contact with an output face 952 of SLM 950.

In some cases, optical system 900 does not include any optical elements with optical power, such as collimating lenses and/or mirrors, between light source 920 and optically absorptive film 970. In some cases, there may be one or more optical elements with no optical power such as a plane mirror, a polarizer, a color or intensity filter, or a retarder between light source 920 and optically absorptive film 970.

In some cases, input face 972 of optically absorptive 970 includes a plurality of optically transparent beads 974 partially embedded in a light absorbing layer (not explicitly shown in FIG. 9). In some cases, optically absorptive film 970 transmits light into a viewing cone 976 that has a viewing angle $\theta_3$. In some cases, $\theta_3$ is different than $\theta_2$. For example, in some cases, $\theta_3$ is smaller than $\theta_2$.

In some cases, the exterior 904 of housing 901 is black. Reflective interior surface 905 of housing 901 can be made reflective by using any method that may be suitable in an application. For example, interior surface 905 can be coated with a light reflecting material such as white paint or white powder, and/or by a reflective metal such as Al by for example vapor deposition. In some cases, such as when surface 905 is coated with a flat light scattering white paint, reflective interior surface 905 is diffusively reflective.

In some cases, interior surface 905 is made reflective by applying a reflective film 903 to the surface. For example, reflective film 903 can be an aluminized film or a multi-layer polymeric reflective film, such as a reflective polarizing film or a Vikuiti ESR film available from 3M Company, St. Paul, Minn. In some cases, reflective film 903 is laminated to the interior surface of housing 901. In some cases, housing 901 can be made, at least in part, from a reflective film. In some cases, reflective film 903 is specularly reflective. In some cases, reflective film 903 is diffusively reflective.

Light source 920 can be any type light source that may be desirable in an application. Exemplary light source include mercury arc light sources, fluorescent light sources, and light emitting diode (LED) light sources. In some cases, light source 920 can include a plurality of light emitting elements, such as two or more LEDs.

Optical system 900 further includes a cover 980 for covering housing 901, optically absorptive film 970, and the other components in the optical system. In some cases, cover 980 can be permanently attached to optically absorptive film 970. In some cases, cover 980 can be "releasably attached" to optically absorptive film 970, meaning that the attached cover can be removed from the absorptive film without any noticeable damage to the cover and/or the film where the detached cover can be subsequently reattached to the film in approximately the same previous attachment location.

In some cases, cover 980 is permanently attached to optically absorptive film 970 and the combination is releasably attached to housing 901. In some cases, such as in the case where optical system 900 is part of an instrument panel of a motor vehicle, the cover may be releasably attached to the instrument panel.

As used herein, terms such as "vertical", "horizontal", "above", "below", "left", "right", "upper" and "lower", "front" and "back", "clockwise" and "counter clockwise" and other similar terms, refer to relative positions as shown in the figures. In general, a physical embodiment can have a different orientation, and in that case, the terms are intended to refer to relative positions modified to the actual orientation of the device. For example, even if the construction in FIG. 1 is flipped as compared to the orientation in the figure, arrow indicator 732 is still considered to be to a "right" arrow indicator.

All patents, patent applications, and other publications cited above are incorporated by reference into this document as if reproduced in full. While specific examples of the invention are described in detail above to facilitate explanation of various aspects of the invention, it should be understood that the intention is not to limit the invention to the specifics of the examples. Rather, the intention is to cover all modifications, embodiments, and alternatives falling within the spirit and scope of the invention as defined by the appended claims.

What is claimed is:

1. An optical system for displaying an image to a viewing position, comprising:
    a housing comprising an interior, a reflective interior surface, and a first opening;
    a spatial light modulator disposed proximate the first opening;
    a light source disposed within the interior of the housing, the spatial light modulator modulating light emitted by the light source to form image rays;
    a first light redirecting film disposed proximate the first opening between the spatial light modulator and the light source and recycling at least a portion of light emitted by the light source; and
    an optically absorptive film disposed proximate the first opening between the spatial light modulator and the viewing position, the optically absorptive film receiving the image rays from the spatial light modulator and displaying the received image rays to the viewing position.

2. The optical system of claim 1, wherein the reflective interior surface of the house is diffusively reflective.

3. The optical system of claim 1, wherein the housing further comprises a black exterior.

4. The optical system of claim 1, wherein the reflective interior surface includes a reflective coating.

5. The optical system of claim 1, wherein the reflective interior surface includes a reflective film laminated to the interior surface.

6. The optical system of claim 1, wherein the light source comprises a plurality of light emitting elements.

7. The optical system of claim 1, wherein the light source comprises an LED.

8. The optical system of claim 1, wherein the first light redirecting film comprises and array of linear prisms.

9. The optical system of claim 1 further comprising a second light redirecting film disposed proximate the first opening between the first light redirecting film and the spatial light modulator and recycling at least a portion of light emitted by the light source.

10. The optical system of claim 1, wherein the optically absorptive film comprises:
    an optically absorptive layer; and
    a plurality of optically transparent beads partially embedded in the optically absorptive layer, the embedded portion of the beads facing the viewing position.

11. The optical system of claim 1, wherein the spatial light modulator forms the image rays within an emitted cone having an emitted angle, and wherein the optically absorptive film has an acceptance angle that is at least as large as the emitted angle.

12. The optical system of claim 1 further comprising a cover attached to a viewing side of the optically absorptive film facing the viewing position.

13. The optical system of claim 12, wherein the cover and the optically absorptive film are releasably attached to the housing.

* * * * *